United States Patent Office 3,082,247
Patented Mar. 19, 1963

3,082,247
PREPARATION OF CYCLOHEXYLSULFAMATES
Morris Freifelder, Waukegan, Ill., assignor to Abbott Laboratories, North Chicago, Ill., a corporation of Illinois
No Drawing. Filed May 25, 1959, Ser. No. 815,278
6 Claims. (Cl. 260—500)

This invention relates to a novel method for reducing phenylsulfamic acid and phenylsulfamates to the corresponding cyclohexyl derivatives and to a method for preparing alkali cyclohexylsulfamates from ammonium phenylsulfamate.

Cyclohexylsulfamic acid and cyclohexylsulfamates are well-known compounds which stimulate the sense perception of sweetness. An example of such a cyclohexylsulfamate is sodium cyclohexylsulfamate known generically as sodium cyclamate. The general method in the prior art for preparing cyclohexylsulfamate provides reacting cyclohexylamine with sulfamic acid. Cyclohexylamine is an expensive reactant, and the amine salt prepared from the foregoing reactant involves several procedural steps prior to isolation.

It is highly desirable to employ aniline in place of cyclohexylamine as a starting reactant because of its low cost. The long existing problem which prevents use of aniline as the starting reactant is the inability to reduce the resulting phenylsulfamic acid and phenylsulfamates to the cyclohexyl form. While phenylsulfamic acid and phenylsulfamates can be prepared by prior art methods (L. F. Audrieth and M. Sveda, "J. Org. Chem.," vol. 9, pp. 89–101, 1944; C.A. 48, 2635, 1954), the reduction of said compounds to the cyclohexyl form has not been known. The existence of this problem is supported by the fact that related compounds such as sulfanilamide and sulfanilic acid cannot be hydrogenated to the corresponding cyclohexyl derivatives. It is also expected that any attempted reduction of phenylsulfamic acid would fail because it is known that said acid tends to rearrange to orthanilic acid and sulfanilic acid under acid conditions. The prior art method which teaches reacting aniline with chlorosulfonic acid results in the aniline salt of phenylsulfamic acid or aniline phenylsulfamate together with aniline hydrochloride. The mixture of the double salt and aniline hydrochloride is removed by filtration and decomposed with an aqueous alkali hydroxide solution to form an alkali phenylsulfamate free aniline and alkali chloride. Since the free aniline is not separated in the process, it must be removed by extraction with an organic solvent such as ether. The aqueous layer must be evaporated to dryness and the residue extracted with an alcohol to obtain the alkali phenylsulfamate free from alkali chloride for subsequent reduction to the desired alkali cyclamate. The same procedural objections apply when cyclohexylamine, rather than aniline, is reacted with chlorosulfonic acid.

It is an object of this invention to provide a method for reducing phenylsulfamic acid and phenylsulfamates.

Another object of this invention is to provide a reduction method which is simple and economical.

A still further object of this invention is to utilize a novel reduction step on the easily obtainable phenylsulfamic acid and its salts.

In accordance with the foregoing objects and other objects which will be apparent, it has now been found that phenylsulfamic acid and phenylsulfamates can be reduced to the corresponding cyclohexyl derivatives in the presence of catalytic amounts of ruthenium. By the term "phenylsulfamates" is meant non-toxic or physiologically acceptable salts of phenylsulfamic acid. Of special interest are the non-toxic alkali metal and alkaline earth salts. Sodium and calcium salts are desirable because of their availability and low toxicity. It will be apparent that other non-toxic salts may be used such as the potassium salt. The ammonium salts are also suitable as are the amine salts such as the glycine, ethanolamine and diethanolamine salts and salts of other non-toxic organic bases. The reduction is conducted directly under moderate pressure and moderately elevated temperature to provide the cyclohexyl form in high yields, although relatively high temperatures and pressures may be warranted to accelerate reduction.

In the process of obtaining alkali metal and alkaline earth cyclamates such as sodium and calcium cyclamate it is desirable to employ ammonium phenylsulfamate as a starting reactant. This particular reactant is obtained simply and directly by reacting aniline and sulfamic acid (C.A. 48, 2635, 1954). The collected ammonium phenylsulfamate is reduced to ammonium cyclohexylsulfamate by the catalytic method described herein and an alkali metal hydroxide such as sodium hydroxide or alkali earth hydroxide such as calcium hydroxide is added thereto to obtain the desired alkali or alkaline earth cyclohexylsulfamate.

The process substantially provides admixing phenylsulfamic acid and its salts with catalytic amounts of the specified catalyst on a carrier and hydrogenating the mixture at a temperature between about 60° and about 100° C. and a pressure in excess of 100 p.s.i. until 3 moles of hydrogen are taken up. If phenyl sulfamic acid is used, the obtained cyclohexylsulfamic acid is then converted to the desired alkali or alkaline earth metal cyclohexylsulfamate. If a phenylsulfamate other than the desired alkali or alkaline earth metal form is used, such as ammonium, it is subsequently converted to the alkali metal and alkaline earth forms as hereinafter described in the examples.

It is, therefore, further provided by this invention that ammonium phenylsulfamate can be converted to an alkali phenylsulfamate and subsequently reduced to the desired alkali cyclamate or ammonium phenylsulfamate is reduced to ammonium cyclohexylsulfamate and then converted to the desired alkali cyclohexylsulfamate.

The following examples are presented to teach the invention in operation, but it should be understood that they are not an exclusive embodiment thereof.

EXAMPLE I

Ammonium phenylsulfamate, 34.2 g. (0.18 mole), is dissolved in 250 cc. of water. To the filtered solution is added 1.03 g. ruthenium oxide. The mixture is hydrogenated in an autoclave under 300 pounds pressure at 75–80° C. At this temperature, the hydrogen uptake proceeds at such a rate that the reaction is completed in less than 3 hours. The solution is filtered to remove catalyst and concentrated under reduced pressure to dryness. The dried solid product is 30 g. ammonium cyclohexylsulfamate corresponding to 85% of theory. The product has a sweet taste.

A 5 g. sample of the obtained product is dissolved in 200 cc. water, is passed through a 2 cm. wide, 40 cm. long IRA–120 resin column (acid form of an Amberlite ion exchange resin marketed by Rohm & Haas) and, thereafter, the solution is evaporated to dryness under reduced pressure. Free cyclohexylsulfamic acid, 4.5 g. or 96%, is obtained having a M.P. of 178–180° C. A sample of this acid is mixed with a known sample of cyclohexylsulfamic acid. The M.P. of the resultant mixture is not depressed, which confirms the identity of the obtained cyclohexylsulfamate and cyclohexylsulfamic acid.

In a repetition of this example, ammonium phenylsulfamate is replaced by the corresponding free acid with identical reaction conditions. Comparable yields of cyclohexylsulfamic acid are obtained in a one-step process.

EXAMPLE II

A similar run is carried out at 70° C. and 500 p.s.i. pressure. When the uptake of hydrogen is completed, the same procedure is followed as in Example I. An 85% yield of the product of Example 1 is obtained. Replacing ammonium phenylsulfamate with the corresponding sodium salt, sodium cyclohexylsulfamate is obtained in comparable yields.

EXAMPLE III

The same quantities as in Example I are reacted at 1000 p.s.i. and 60–70° C. The hydrogen uptake is completed in less than 2 hours. Since this uptake does not occur until the temperature reaches about 60° C., the actual reaction time is much less. The yield of ammonium cyclohexylsulfamate is 79.5%.

In a similar experiment, the ammonium phenylsulfamate is replaced by 35.1 g. calcium phenylsulfamate and a similar yield of calcium cyclohexylsulfamate is obtained.

EXAMPLE IV

To 38.0 g. (0.2 mole) ammonium phenylsulfamate dissolved in 250 cc. water is added 10.0 g. 5% ruthenium on alumina and the mixture is hydrogenated under 1200 p.s.i. pressure at 80° C. The uptake of hydrogen begins at 60° C. and is about 40% complete in one hour. The uptake of hydrogen continues and after completion of the reaction, ammonium cyclohexylsulfamate is isolated and characterized as cyclohexylsulfamic acid as in Example I.

EXAMPLE V

Calcium Cyclohexylsulfamate

Calcium hydroxide (37 g., 0.5 mole) is added to a solution of 196 g. (1 mole) ammonium cyclohexylsulfamate in 400 cc. water. The mixture is heated to 50° C. to drive off liberated ammonia; thereafter, 10 g. of activated carbon is added and the mixture is filtered. The mixture is cooled to 10° C., whereupon calcium cyclohexylsulfamate crystallizes from solution. Concentration of the filtrate results in an additional crop of calcium cyclohexylsulfamate for a total yield of 90%. The calcium cyclohexylsulfamate is passed through an ion exchange resin as described in Example I to obtain free cyclohexylsulfamic acid, melting at 178–180° C. The M.P. is not depressed when the sample is mixed with a known sample of cyclohexylsulfamic acid.

In the foregoing examples phenylsulfamic acid and its salts are reduced to the corresponding cyclohexyl derivatives in the presence of a catalytic amount of ruthenium at a temperature of about 50° C., preferably above 60° C., and slightly elevated pressures. The time required for complete hydrogen uptake is about 3 hours, but by increasing the temperature and/or pressure of the reduction process, the time consumption for complete hydrogen uptake may be reduced.

The invention discloses the operability of the specific catalyst, ruthenium, for reducing phenylsulfamic acid and phenylsulfamates. It is apparent that variations in temperature, pressure, catalyst ratio and physical equipment comprise a portion of the disclosed process. By employing the specific catalyst in the manner disclosed, standard steps in the hydrogenation art may be modified to still obtain the cyclohexylsulfamic acid and cyclohexylsulfamates. The aforementioned variations may reside in the choice of carrier, ratio of catalyst to unreduced reactant, temperature, pressure and mechanical apparatus.

Since hydrogenation takes place at 60–80° C. and at higher pressure (that is at about 200 atmospheres to 1000 p.s.i.) more readily than at a few atmospheres, it is evident that by increasing the pressure and the amount of catalyst, a continuous process can be devised whereby a solution of ammonium phenylsulfamate flows through a bed of ruthenium in any of its catalytic forms either concurrently with a stream of hydrogen or countercurrent to hydrogen. The reduced solution may then be concentrated to yield ammonium cyclohexylsulfamate or be converted to sodium or calcium cyclohexylsulfamate by treatment with the equivalent amount of the corresponding sodium or calcium hydroxide. The salt form may be conveniently isolated by evaporation of the solution to dryness or by crystallization in known manners.

Others may practice the invention in any of the numerous ways which will be suggested by this disclosure to one skilled in the art. All such practice of the invention is considered to be a part hereof provided it falls within the scope of the appended claims.

I claim:

1. The method of preparing a compound of the formula

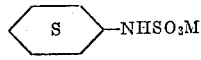

wherein M is selected from the group consisting of hydrogen, ammonium, alkali metal and alkaline earth metal, consisting essentially of hydrogenating a starting material of the formula

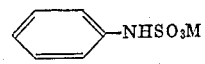

wherein M has the above meaning, with gaseous hydrogen in the presence of a catalytic amount of ruthenium at a pressure of at least 100 p.s.i. and at a temperature of at least 60° C.

2. The process of claim 1 wherein said treatment with hydrogen is continued until three moles of hydrogen are absorbed per mole of starting material.

3. The method according to claim 1 wherein said starting material is sodium phenylsulfamate.

4. The method according to claim 1 wherein said starting material is calcium phenylsulfamate.

5. The method according to claim 1 wherein said starting material is phenylsulfamic acid.

6. The method of preparing a salt of cyclohexylsulfamic acid consisting essentially of reducing ammonium phenylsulfamate in the presence of a catalytic amount of ruthenium at a temperature of at least 60° C. and at a pressure of at least 100 p.s.i. to obtain ammonium cyclohexylsulfamate, and adding to said ammonium cyclohexylsulfamate a stoichiometric amount of a base selected from the group consisting of alkali hydroxide and alkaline earth hydroxide.

References Cited in the file of this patent

UNITED STATES PATENTS

| | | |
|---|---|---|
| 2,606,924 | Whitman | Aug. 12, 1952 |
| 2,606,927 | Barkdoll et al. | Aug. 12, 1952 |
| 2,675,390 | Rosenblatt | Apr. 13, 1954 |

OTHER REFERENCES

Ellis: "Hydrogenation of Organic Substances," 3rd edition, pp. 87–88 (1930).

Fuson et al.: "Organic Chemistry," 2nd edition, page 488 (1954).

(Copies of above publications in Patent Off. Sci. Lib.)